(12) United States Patent
Osman et al.

(10) Patent No.: US 9,183,683 B2
(45) Date of Patent: Nov. 10, 2015

(54) METHOD AND SYSTEM FOR ACCESS TO SECURE RESOURCES

(75) Inventors: Steven Osman, San Francisco, CA (US); Jeffrey Roger Stafford, Redwood City, CA (US); Yunpeng Zhu, Foster City, CA (US)

(73) Assignee: SONY COMPUTER ENTERTAINMENT INC., Tokyo (JP)

(*) Notice: Subject to any disclaimer, the term of this patent is extended or adjusted under 35 U.S.C. 154(b) by 254 days.

(21) Appl. No.: 12/892,489

(22) Filed: Sep. 28, 2010

(65) Prior Publication Data
US 2012/0075062 A1    Mar. 29, 2012

(51) Int. Cl.
G05B 19/00 (2006.01)
G07C 9/00 (2006.01)
G06F 21/35 (2013.01)

(52) U.S. Cl.
CPC ............ G07C 9/00087 (2013.01); G06F 21/35 (2013.01); G07C 9/00309 (2013.01); G07C 9/00563 (2013.01)

(58) Field of Classification Search
CPC .................................................. G07C 9/00309
USPC ........ 340/5.2, 5.3–5.33, 5.4, 5.52, 5.53, 5.54, 340/5.5, 5.64, 5.65, 5.66, 5.7, 5.82–5.84, 340/10.1–10.6, 572.1–572.7; 341/176; 361/172; 382/115–127; 705/18; 902/3, 902/5; 235/441–443; 455/414.1; 713/172; 726/3
See application file for complete search history.

(56) References Cited

U.S. PATENT DOCUMENTS

| 4,787,051 | A | 11/1988 | Olson |
| 4,843,568 | A | 6/1989 | Krueger |
| 5,128,671 | A | 7/1992 | Thomas, Jr. |
| 5,528,265 | A | 6/1996 | Harrison |
| 6,157,368 | A | 12/2000 | Faeger |
| 6,360,321 | B1 * | 3/2002 | Gressel et al. ................ 713/172 |
| 6,375,572 | B1 | 4/2002 | Masuyama |
| 6,483,425 | B1 * | 11/2002 | Avenel .......................... 340/5.61 |
| 7,088,220 | B2 * | 8/2006 | Kotzin ........................... 340/5.82 |
| 2002/0085097 | A1 | 7/2002 | Colmenarez et al. |
| 2004/0212589 | A1 | 10/2004 | Hall et al. |
| 2005/0001711 | A1 * | 1/2005 | Doughty et al. ............. 340/5.74 |
| 2007/0271596 | A1 * | 11/2007 | Boubion et al. .................. 726/3 |
| 2009/0117883 | A1 * | 5/2009 | Coffing et al. ............. 455/414.1 |
| 2009/0198618 | A1 | 8/2009 | Chan et al. |
| 2009/0320118 | A1 | 12/2009 | Muller et al. |
| 2010/0194571 | A1 | 8/2010 | Ortiz et al. |

OTHER PUBLICATIONS

Bolt, R.A., "Put-that-there": voice and gesture at the graphics interface, Computer Graphics, vol. 14, No. 3 (ACM SIGGRAPH Conference Proceedings) Jul. 1980, pp. 262-270.

(Continued)

*Primary Examiner* — Benjamin C Lee
*Assistant Examiner* — Israel Daramola
(74) *Attorney, Agent, or Firm* — Frommer Lawrence & Haug LLP; William S. Frommer; Paul A. Levy

(57) ABSTRACT

A system and method for accessing secured resources using a portable device. When a user with such a portable device is within close proximity to a locked door or other secured resource, a verification process can be automatically initiated on the device. The user verification could utilize all the input and sensor methods on the device. Once the identification process has successfully completed, an access code can be transmitted to the locked door or device via wired or wireless network. This allows for reduced electronics required at these locked doors and allows for more dynamic security measures.

18 Claims, 11 Drawing Sheets

(56) References Cited

OTHER PUBLICATIONS

DeWitt, Thomas and Edelstein, Phil, "Pantomation: A System for Position Tracking," Proceedings of the $2^{nd}$ Symposium on Small Computers in the Arts, Oct. 1982, pp. 61-69.

John Biggs; Home Security Alarms Now DIY Projects, New Breed of Systems, Taking Advantage of Wireless Monitors, Battery-Operated Sensors; The Seattle Times; Sunday, Jul. 25, 2010; E2 Real Estate; The New York Times.

* cited by examiner

112

METHOD AND SYSTEM FOR ACCESS TO SECURE RESOURCES

BACKGROUND

1. Field of the Invention

This invention relates generally to a method apparatus and system for enabling secure access to secured resources. More particularly, the present invention relates to identifying a level of access a device and/or user is entitled based on a security level of the device and the access available to a user.

2. Background Discussion

Typically, in a secured resource system such as doors, computers and other devices, the secured devices will be unlocked when a user's identity and access is verified at a card reader physically attached to the door, the computer or other devices. When there are a plurality of devices in the secured system, such an identification process is time consuming and inconvenient for the user, as it requires the user to perform the identification process at each of the secured device one by one, and the cost of the secured system is also increased because more electronics are required.

SUMMARY

Thus, the present invention is directed to a system and method for accessing secured resources using a portable device. When a user with such a portable device is within close proximity to the locked door or device (resource), the verification process can be automatically initiated on the device. The user verification may utilize all the input and/or sensor methods or capabilities on the device or any desired subset of input/sensor methods. Once the identification process has successfully been completed, an access code can be transmitted to the locked door or device via wired or wireless network. This allows for reduced electronics required at these locked doors and allows for more dynamic security measures.

One embodiment of the present invention is directed to a method (the method) for an external device to gain access to a secure area of a resource. The method includes transmitting a signal that identifies that the device is capable of authentication. An initiation of a communication, from the identified device, with the resource is received. The initiation of communication is responded to by transmitting one or more authentication mechanisms of the device, the authentication mechanisms typically being hardware devices for identifying an attribute of a user of the device. A request for use of one or more of the authentication mechanisms is received. A token for each of the requested authentication mechanisms is transmitted from the device to the resource. Access to the secure area is gained in response to acceptance of the one or more of the tokens by the resource.

Another embodiment of the present invention is directed to the method for an external a device to gain access to a secure area of a resource described above in which the communication is wireless.

Another embodiment of the present invention is directed to the method for an external a device to gain access to a secure area of a resource described above in which the device is a portable device.

Yet another embodiment of the present invention is directed to the method for an external a device to gain access to a secure area of a resource described above in which the authentication mechanism is possession of the device.

Yet another embodiment of the present invention is directed to the method for an external a device to gain access to a secure area of a resource described above in which the authentication mechanism is a biometric.

Yet another embodiment of the present invention is directed to the method for an external a device to gain access to a secure area of a resource described above in which the external device transmits an activation signal to the resource.

Yet another embodiment of the present invention is directed to a method for a resource to grant access to a secure area of the resource to an external device. The method includes receiving a signal from the external device that is capable of authentication. A communication with the external device is initiated. A list of one or more authentication tokens the external device capable of providing is received, the authentication tokens being results of hardware devices for identifying an attribute of a user of the external device. A request for one or more authentication tokens is transmitted. One or more authentication tokens in response to the request are received. The external device is granted access to the secure area based upon acceptability of the one or more authentication tokens.

Yet another embodiment of the present invention is directed to the method for a resource to grant access to a secure area of the resource described above in which the authentication token is a biometric.

Yet another embodiment of the present invention is directed to the method for a resource to grant access to a secure area of the resource described above in which the communication is wireless.

Yet another embodiment of the present invention is directed to the method for a resource to grant access to a secure area of the resource by an external device wherein the resource transmits an activation signal to the external device. This activation may be, for example, a signal that activates the external device and/or provides operating power to the device.

Yet another embodiment of the present invention is directed to a device (the device) for gaining access to a secure area of a resource. The device includes a first transmitter to transmit a signal that identifies the device as capable of authentication. A first receiver receives an initiation of a communication with the resource. A controller responds to the initiation of the communication by transmitting one or more authentication mechanisms of the device, the authentication mechanisms being hardware devices for identifying an attribute of a user of the device. A second receiver receives a request for use of one or more of the authentication mechanisms. A second transmitter transmits a token for each of the requested authentication mechanisms. The device further gains access to the secure area in response to acceptance of the one or more of the tokens by the resource.

Yet another embodiment of the present invention is directed to the device described above in which the communication is wireless.

Yet another embodiment of the present invention is directed to an authentication unit (the authentication unit) of a resource for granting access, to a secure area of the resource, to an external device. The authentication unit includes a first receiver to receive a signal from the external device that is capable of authentication. A communicator initiates wireless communication with the external device. A second receiver receives a list of one or more authentication tokens the external device is capable of providing, the authentication tokens being results of hardware devices for identifying an attribute of a user of the external device. A transmitter transmits a request for one or more authentication tokens. A third receiver receives one or more authentication tokens in response to the request. An authenticator unit grants the external device access to the secure area based upon acceptability of the one or more authentication tokens.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

Figure 1:
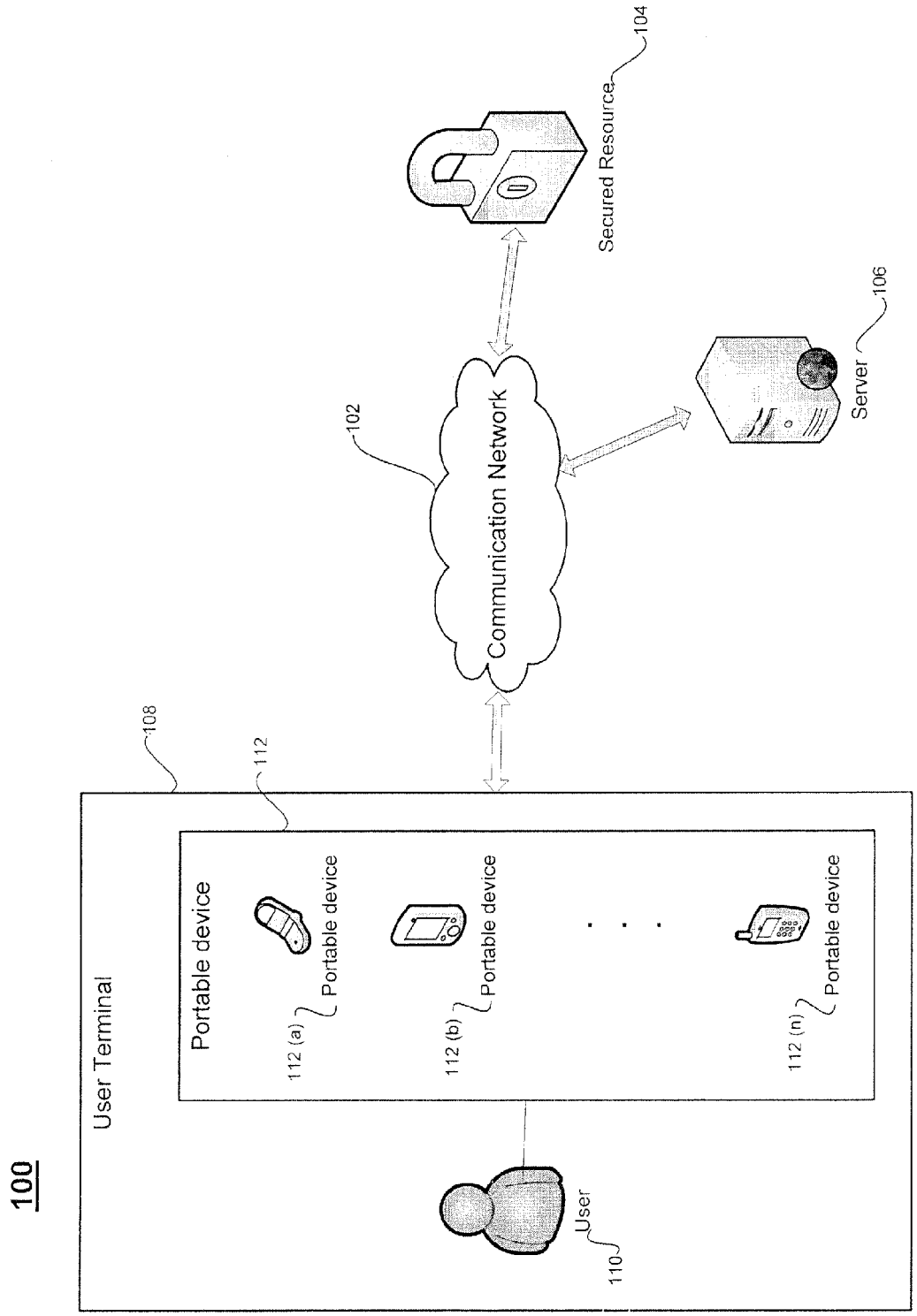
FIG. 1 illustrates an example of a system of one embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Other embodiments of the present invention include the methods described above but implemented using apparatus or programmed as computer code to be executed by one or more processors operating in conjunction with one or more electronic storage media.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media. This electronic storage media may include, for example a non-transitory electronic storage medium/media such as a register, or other electronic repository or electronic storage location for data that is capable of storing data represented in electronic form, such as bits, bytes, kilobytes, waveforms, electronic signals, digital format and other data types and forms.

Embodiments of the present invention may be implemented using one or more processing devices, or processing modules. The processing devices, or modules, may be coupled such that portions of the processing and/or data manipulation may be performed at one or more processing devices and shared or transmitted between a plurality of processing devices.

FIG. 1 illustrates an example of a network system 100 that supports embodiments of the present invention. The system 100 shown in FIG. 1 includes a network 102, a secured resource 104, a server 106, and a user 110 having access to one or more of a plurality of portable devices 112(*a*), 112(*b*) . . . 112(*n*) (where "n" is any suitable number).

The network 102 is, for example, any combination of linked computers, or processing devices, adapted to transfer and process data. The network 102 may be private Internet Protocol (IP) networks, as well as public IP networks, such as the Internet that can utilize World Wide Web (www) browsing functionality. An example of a wired network is a network that uses communication buses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers.

The secured resource 104 may be, for example, a door, a computer (or memory or accessible portion of a computer device), secured physical compartment and/or electronic location such as a database, website or other restricted or partially restricted area or a network, or portions of a network, such as a VPN. In some cases, the security resource 104 could have multiple levels of security, for example a computer network that offers a range of services, from simple email and calendar access through access to more restricted areas, or levels, or resources, such as financial statements, address book and/or confidential documents or other areas that have information that limited access to is desired. The security system attached to the secured resource 104 can identify that the user 110 is carrying a portable device 112 capable of authentication and open a wired or wireless connection to that portable device.

The server module, or facility, or unit, 106 is typically one or more processors with associated memory, such as computers, or other processing devices such as a desktop computer, laptop computer, personal digital assistant (PDA), wireless handheld device, cellular telephone, PLAYSTATION™, PSP™ and the like. They may be capable of processing and storing data themselves or merely capable of accessing processed and stored data from another location (i.e., both thin and fat terminals).

User terminal 108 is shown as including a user 110 and one or more portable devices 112 that the user 110 may have access or possession. At the user terminal 108, a user 110 may carry or access one or more of a plurality of portable devices 112(a) . . . (n) (generally referred to as 112, herein). The portable devices 112 typically include devices with processing capabilities and memory and an output displays, such as, cell phone, personal digital assistant (PDA), wireless handheld device, PLAYSTATION™, PSP™ and the like. The portable devices 112 may be capable of processing and storing and displaying data themselves or merely capable of accessing processed and stored data from another location (i.e., both thin and fat terminals) and displaying the accessed or retrieved data. It is also an embodiment of the present invention that the functionality of server 106 could also be part of secured resource 104 and/or portable device 112.

The user terminal 108, using portable devices 112, submits security tokens to the server module 106, via network 102. The server module 106 receives security tokens from the user terminal 108 and sends the token to security resource 104. The security resource 104 then executes the identification process based on the received tokens.

Security resource 104, server module 106, and user terminals 108 are coupled to network 102 via an associated bi-directional communication medium, which may be for example a serial bus such as IEEE 1394, or other wire or wireless transmission medium. The security resource 104, server module 106, and the user terminal 108 may be communication appliances, or user locations, or subscriber devices, or client terminals.

Figure 2:
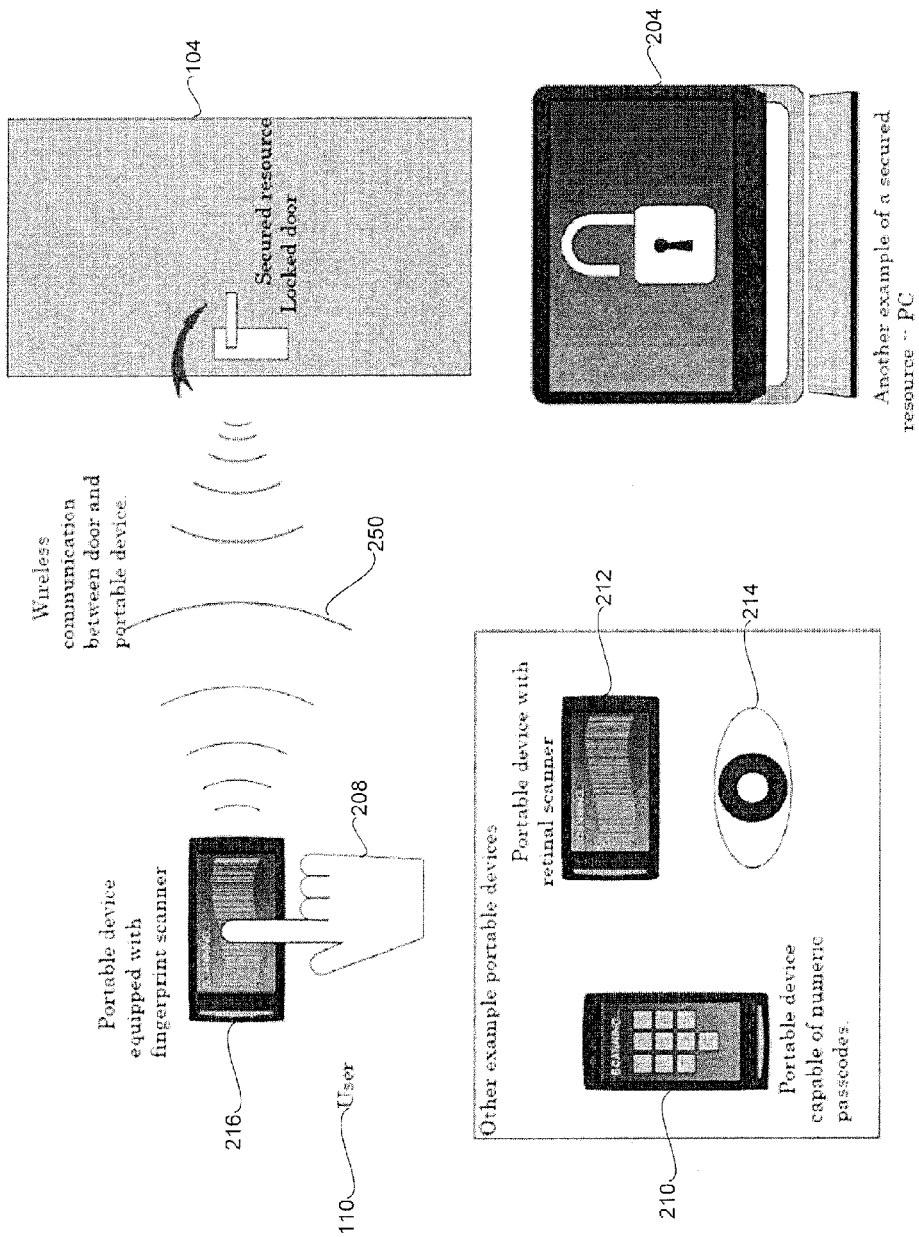
FIG. 2 illustrates an example of a schematic diagram of an embodiment of the present invention.

FIG. 2 illustrates a schematic diagram of an example of a system 200 according to an embodiment of the present invention.

When user 110 wishes to access a secured resource 104, such as a locked room, compartment, or restricted area or portion of a network or electronic storage area or database the user uses his/her portable device (shown as element 112 in FIG. 1 and element 216 in FIG. 2), which is shown in FIG. 2 as equipped with a fingerprint scanner, to perform wired or wireless communication 250 with the secured resource, such as a locked door, 104. If the secured resource 104 determines that a fingerprint scan is appropriate, the user 110 swipes his/her finger 208 over the portable device 216. Then the portable device 216 communicates with the secured resource 104 regarding his/her fingerprint credentials. If the fingerprint is accepted by the secured resource 104, the secured resource 104, i.e., the locked room is unlocked.

Furthermore, as shown in FIG. 2, portable devices 210 and 212 illustrate other examples of portable devices equipped with other possible security mechanisms. For example, a portable device 210 equipped with a numeric touch pad and/or passcode at which the user 110 may input a numeric password or user identification or personal identification number (PIN). Furthermore, portable device 212 is equipped with a retinal scanner by which the user 110 may place his/her eye 214 to verify the identity of a person. Secured resource 204 illustrates another type of secured resource, such as a PC-based resource. The various secured resources (shown as 104, 204) may be accessed by one or more portable devices. Each secured resource (104, 204) may have varying levels of resource security. For example, a key pad with numeric buttons that permit entry of a numeric code may adequate for accessing a low security level resource while a retinal scanner of a particular individual may be required for a higher level resource security.

As illustrated in FIG. 2, the security resource 104 could have multiple levels of security for different services. In that case, when the user is granted access to the secured resource and requests a particular service, a security token module of the security system determines whether the user has been granted access to the requested service according to the security tokens provided by the user.

Figure 3:
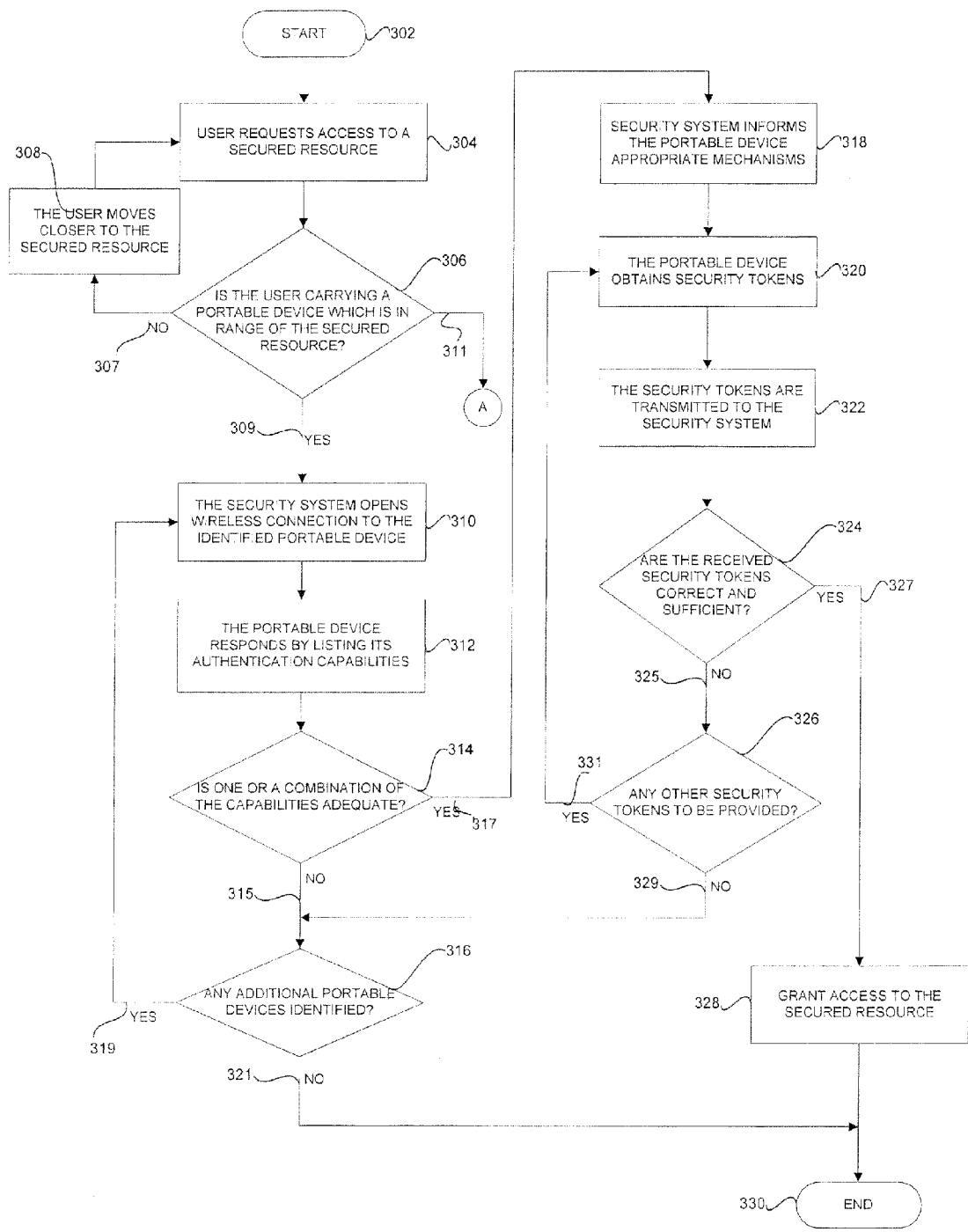
FIG. 3 illustrates an example of a series of steps according to an embodiment of the present invention.

FIG. 3 illustrates a series of steps of accessing a secured resource according to an embodiment of the present invention. FIG. 3 shows a process, which is for example, a series of steps, or program code, or algorithm stored on an electronic memory or computer-readable medium. For example, the steps of FIG. 3 may be stored on a computer-readable medium, such as ROM, RAM, EEPROM, CD, DVD, or other non-volatile memory or non-transitory computer-readable medium. The process may also be a module that includes an electronic memory, with program code stored thereon to perform the functionality. This memory is a structural article. As shown in FIG. 3, the series of steps may be represented as a flowchart 300 that may be executed by a processor, processing unit, or otherwise executed to perform the identified functions and may also be stored in one or more memories and/or one or more electronic media and/or computer-readable media, which include non-transitory media as well as signals. For example, the steps of FIG. 3 may be stored on a computer-readable medium, such as ROM, RAM, EEPROM, CD, DVD, or other non-volatile memory, non-transitory media. The program code stored on an electronic memory medium is a structural element. The computer program code, as an alternate form of flowchart 300 may be stored in any memory as described herein and, for example, in portable device 112, server 106 or secured resource 104. The process 300 begins with start step 302.

Step 304 shows that a user, having a portable device, approaches a secured resource and requests access to the secured resource. In step 306, the secured resource identifies whether the portable device is in range of the secured resource. If no portable device being capable of authentication is identified, "no" line 307 leads to step 308, and the user, and thus the portable device, may move closer to the secured resource to make sure the device is within the close proximity (a distance sufficiently close to the resource such that the resource may communicate with portable device) to the secured resource and try to request access again in step 304. As shown by line 311, the power requirement of the secured resource may be identified. This embodiment is described in more detail with reference to FIG. 9. Also the power available at the portable device is identified. This power level of the portable device is useful to activate a secured resource (or portion of the secured resource). The power level of the portable device is the power of the portable device to activate or signal a secured resource. The activation electrical power of the secured resource can also be determined. This activation power is the electrical power required to activate the secured resource (or portion thereof) from a dormant or inactive state to an active state. Once the power level of the portable device is identified, a determination can be made as to whether the power level of the portable device is adequate to activate the resource (or portion thereof). If the portable device power is adequate, the portable device sends an activation signal to the secured resource to cause the secured resource to activate.

Figure 4:
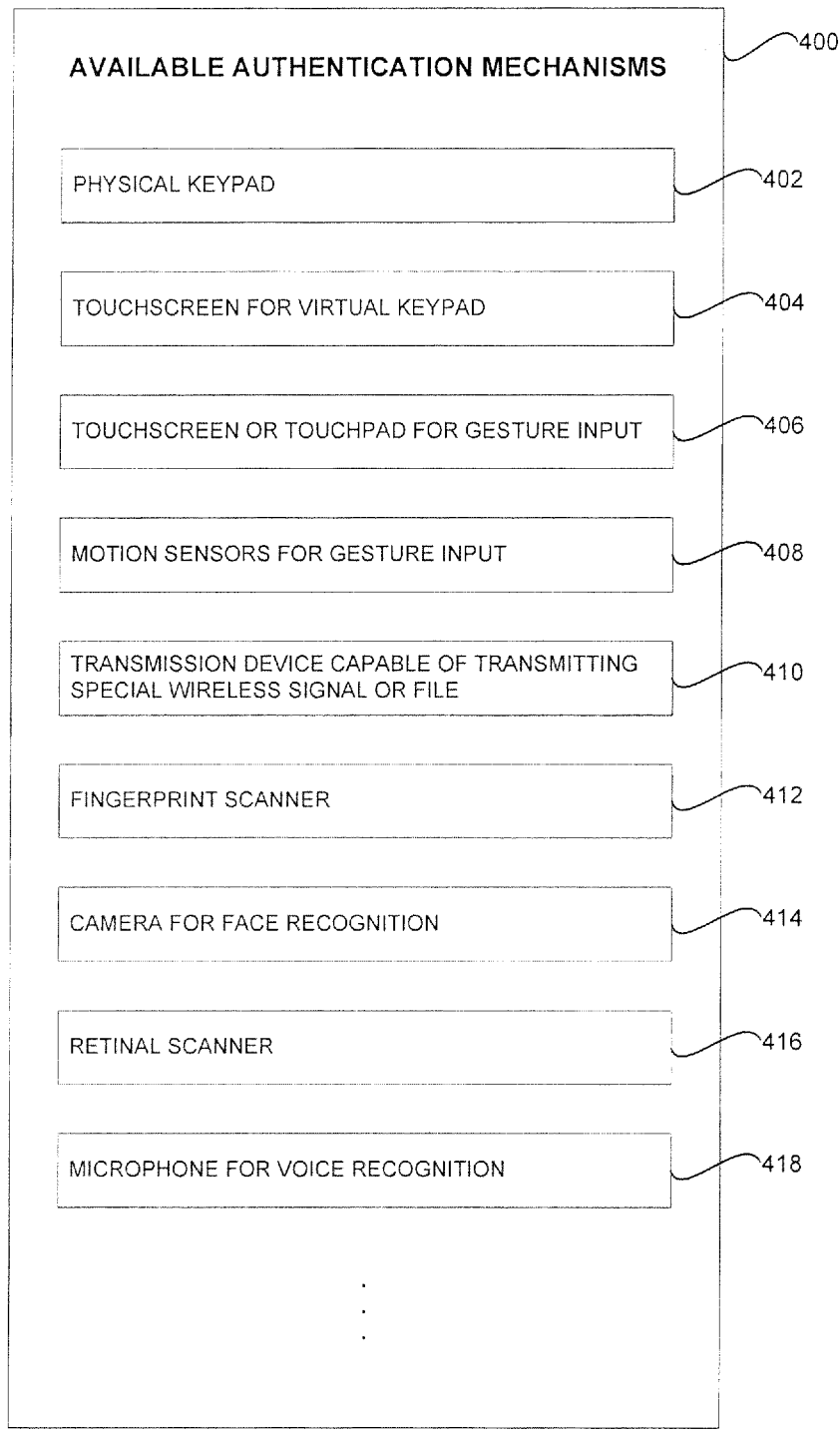
FIG. 4 illustrates an example of authentication mechanisms according to an embodiment of the present invention.

The distance at which the portable device may communicate with the secured resource is typically a function of transmission power and/or reception power of the respective devices. If a portable device capable of authentication is identified in step 306, "yes" line 309 leads to step 310 which shows the security system opens a connection, which may be a wired or wireless connection, to the identified portable device. Then in step 312 the portable device responds by sending its available authentication mechanisms, which is shown in FIG. 4.

Step 314 shows that the security system determines whether one or a combination of the available authentication mechanisms is appropriate to be used. If none is appropriate, "no" line 315 leads to step 316, in which the security system determines whether there are any other portable devices carried by the user. If it is determined that the user is not carrying any other portable devices capable of authentication, "no" line 321 leads to step 330 showing an end step. Otherwise, if other portable devices are identified, "yes" line 319 leads back to step 310. Thus, the determination of portable device authentication capabilities is iterative and involve repeat identification of adequate authentication capabilities or functions.

Referring back to step 314, if one or a combination of the available authentication mechanisms is determined to be acceptable, "yes" line 317 leads to step 318 that shows the security system informs the portable device which authentication mechanism is required to be used corresponding to the appropriate authentication mechanisms via wired or wireless communications. Step 320 shows that after the portable device receives the information about the required security mechanisms, the portable device will obtain security tokens from the user and/or portable device through the required authentication mechanisms. For example, if the required authentication mechanism is retinal scanner, the portable device will request the user to place his/her eye by the retinal scanner, and if the required authentication mechanism is fingerprint scanner, the portable device will request the user to place his/her finger by the fingerprint scanner. Then in step 322, the security tokens obtained in step 320 are transmitted to the security system of the secured resource.

Step 324 shows that the security system determines whether the received security tokens are correct and/or sufficient to grant the user access to the secured resource. If the security tokens are not correct or not sufficient, "no" line 325 leads to step 326 which shows the security system will ask the portable device to provide other security tokens. If no more security tokens will be provided from the portable device, "no" line 329 leads back to step 316 showing that the security system determines whether there are any other portable devices carried by the user. If in step 326 the portable device will provide other security tokens obtained from the user, "yes" line 331 leads back to step 320. Referring back to step 324, if the security tokens are correct and sufficient, "yes" line 327 leads to step 328 which shows the user is granted access to the secured resource, and an end step 330 is reached.

As mentioned previously with respect to FIG. 2, the security resource 104 could have multiple levels of security for different services. In that case, when the user is granted access to the secured resource and requests a particular service, a security token module of the security system determines whether the user has been granted access to the requested service according to the security tokens provided by the user.

FIG. 4 illustrates an example of information about authentication mechanisms 400 according to an embodiment of the present invention. The portable device capable of authentication sends to the security system information about its authentication mechanisms 400, which includes, for example, physical keypad 402, touch screen for virtual keypad 404, touch screen or touchpad for gesture input 406, motion sensors for gesture input 408, transmission device 410 capable of transmitting special wireless signal (blue-tooth, RF, IR, etc.) or a special file used as the key to access the secured system, fingerprint scanner 412, camera for face recognition 414, retinal scanner 416, microphone for voice recognition 418, etc. While the illustrated authentication mechanisms have been shown in relation to FIG. 4, additional authentication mechanisms could also be used.

Figure 5:
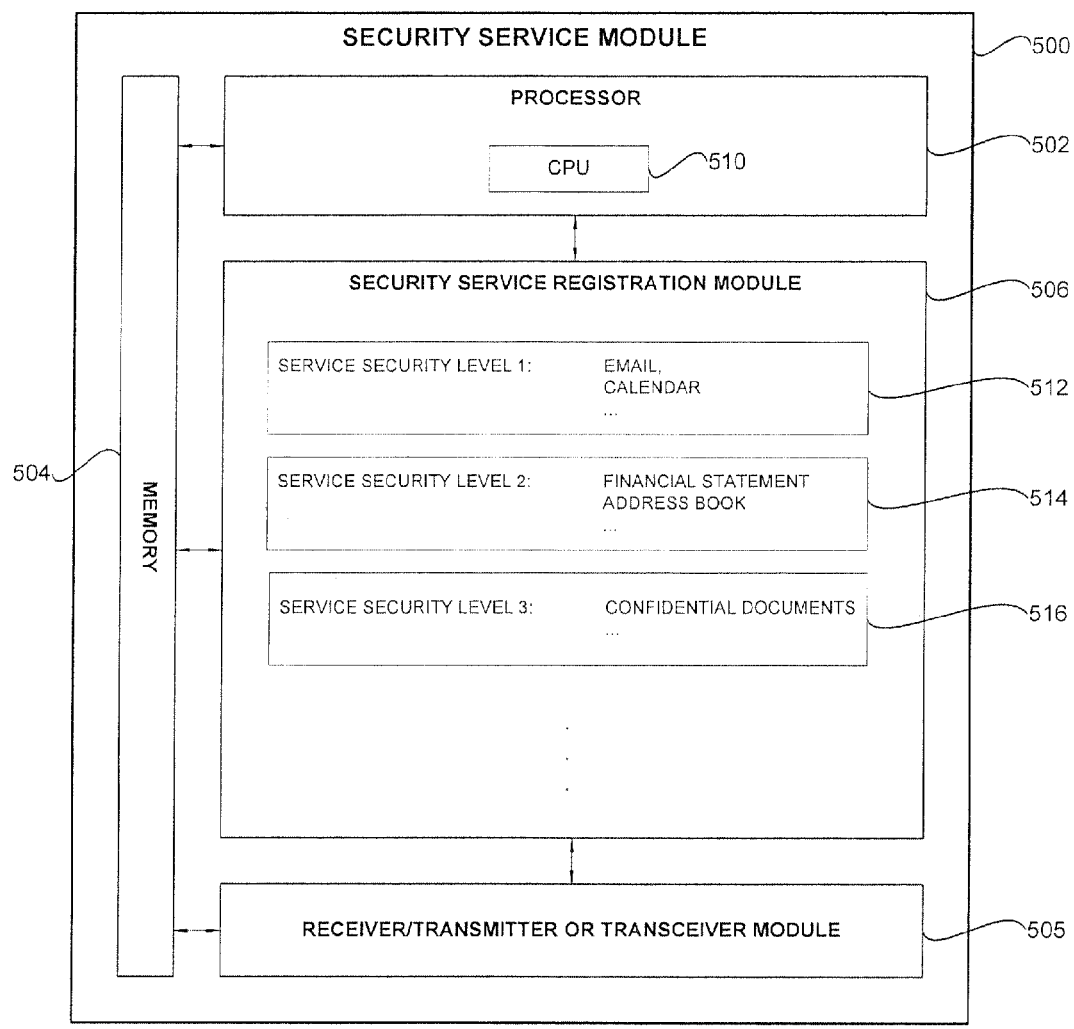
FIG. 5 illustrates an example of security service module according to an embodiment of the present invention.

FIG. 5 illustrates an example of security service module 500 according to an embodiment of the present invention. Security service module 500 includes a processor module 502, a memory module 504 and a security service registration module 506. Security service module 500 may be a module, "plug-in" unit, stand-alone unit or other facility that resides on another module or device. For example, security service module may be a component of, or executed by: portable device(s) 112; server 106; and/or secured resource 104, as described herein.

Processor module 502 is coupled to the security service registration module 506 via an associated communication link to enable processor module 502 and memory 504 to coordinate processing operations of the modules shown in FIG. 5. The processor module 502 includes a CPU 510, which is typically a processor that includes an arithmetic logic unit (ALU), which performs arithmetic and logical operations, and a control unit (CU), which extracts instructions from memory and decodes and executes them, utilizing the ALU when necessary. An I/O interface may be used to operatively couple the components of processor module 502.

Memory module 504 stores programs, which include, for example, a web browser, algorithms, as well as typical operating system programs (not shown), input/output (I/O) programs (not shown), BIOS programs (not shown) and other programs that facilitate operation of security service module 500. The web browser (not shown) is for example an Internet browser program such as Internet Explorer™. Memory module 504 may be, for example, an electronic storage medium, such as an electronic storage repository that can store data used by security service module 500. The memory module 504 may include, for example, RAM, ROM, EEPROM or other memory media, such as an optical disk, optical tape, CD, or a floppy disk, a hard disk, or a removable cartridge, on which digital information is stored in the form of bits. The memory module 504 may also be remote memory coupled to processing module 502 via wired or wireless bi-directional communication medium. A receiver/transmitter or transceiver 505 is used to receive signals from a portable device. The transmitter is used to transmit signals from the secured resource to the portable device.

Security service registration module 506 includes all the security services of different security levels. For example, service group 512 includes the services of security level 1, such as accessing to Email and an electronic calendar; service group 514 includes the services of security level 2, such as accessing to financial statement and address book; service group 516 includes the services of security level 3, such as accessing to confidential document; etc.

Figure 6:
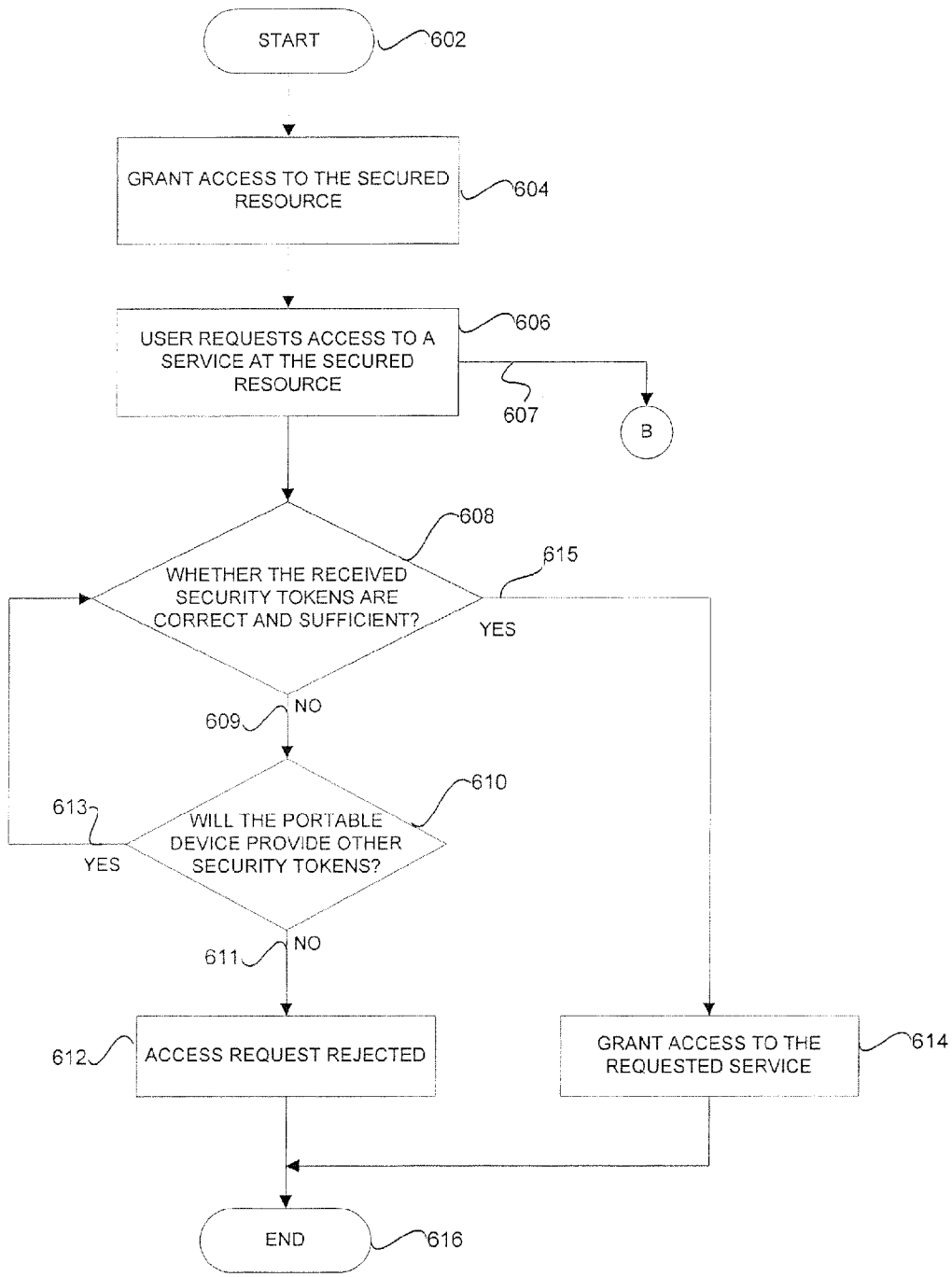
FIG. 6 illustrates a series of steps of accessing services in a secured resource having multiple levels of security according to an embodiment of the present invention.

FIG. 6 illustrates a series of steps of accessing services of a secured resource having multiple levels of security according to an embodiment of the present invention. FIG. 6 shows a process, which is for example, a series of steps, or program code, or algorithm stored on an electronic memory or computer-readable medium. For example, the steps of FIG. 6 may be stored on a computer-readable medium, such as ROM, RAM, EEPROM, CD, DVD, or other non-volatile memory or non-transitory computer-readable medium. The process may also be a module that includes an electronic memory, with program code stored thereon to perform the functionality. This memory is a structural article. The computer program code, as an alternate form of flowchart 600 may be stored in any memory as described herein and, for example, in portable device 112, server 106 or secured resource 104. As shown in FIG. 6, the series of steps may be represented as a flowchart 600 that may be carried out by security service module of FIG. 5. The process 600 begins with start step 602.

In step 604, a user is granted access to the secured resource which has multiple security levels, such as a computer. Step 606 shows that the user requests access to a particular service at the secured resource, such as access to confidential documents. Line 607 shows that a flowchart to an embodiment in which the secured resource provides power to the portable device is an embodiment of the present invention, as described in relation to FIG. 10.

In Step 608 the security system determines that whether the security tokens, provided by the user when he/she is granted access to the secured resource, are correct and sufficient for accessing to the requested service. If the security tokens are not correct or not sufficient, "no" line 609 leads to step 610 which shows the security system will ask the portable device to provide other security tokens. If no more security tokens will be provided from the portable device, "no" line 611 leads to step 612 showing that the access request to the service is rejected, and an end step 616 is reached. If in step 610 the portable device provides other security tokens obtained from the user, "yes" line 613 leads back to step 608. Referring back to step 608, if the security token are correct and sufficient, "yes" line 615 leads to step 614 which shows the user is granted access to the requested service, and an end step 616 is reached.

Figure 7:
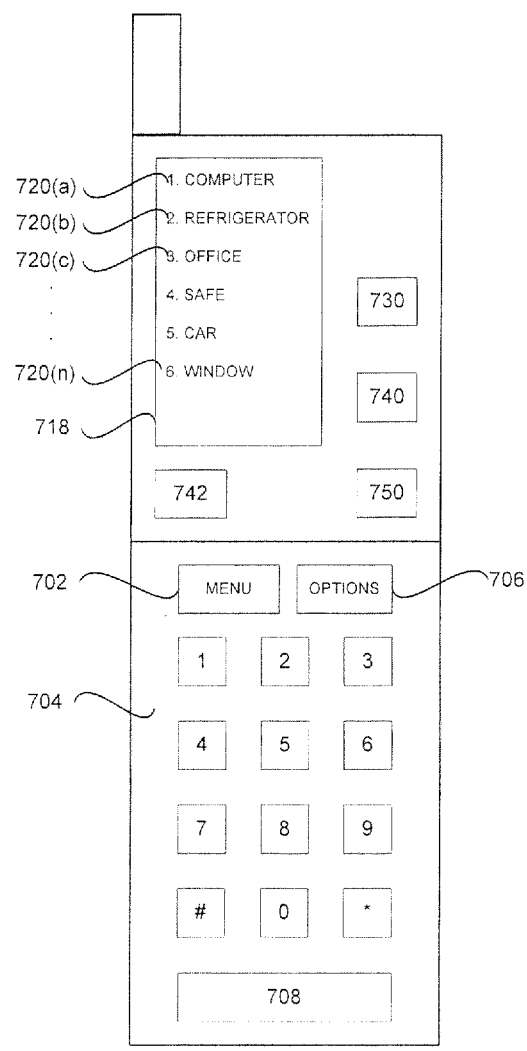
FIG. 7 illustrates an example of a portable device according to an embodiment of the present invention.

FIG. 7 illustrates an example of a portable device 112 according to an embodiment of the present invention. Portable device 112 is shown in FIG. 7 as a cellular telephone. Keypad 704 has a plurality of keys that may be used to access a secured resource. Menu button 702 and options button 706 may be used to facilitate operation in a mode for access, instead of making a telephone call. Biometric module 708 may be used to obtain biometric information (e.g., retinal scan, finger print) from a user. Display area, user interface or screen 718 may be used to provide a display of available resources 720(a) . . . (n) (where "n" is any suitable number). Transmitter 730 may be used to transmit a signal from device 112 to any number of resources (as described herein). Depending on the transmission strength of transmitter 730, the device may initiate a communication (e.g., wireless communication) with any resource that is within signal distance of the device 112. Sensor 740 may also be used to determine whether the device 112 is able to initiate a communication with a resource.

The sensor 740 is used to sense signals from a resource that the device 112 may be able to access. The sensor may be used to output an indication 742 that the device is in sufficiently close proximity to a resource. Indicator 742 may be an audio and/or visual representation of the sensor 740 detecting a resource, such as an LED, light, audible signal, ringtone or other alert.

Activate, or battery, module 750 may be used to identify that a resource is in a power-down mode or "sleep" mode to conserve power. The activate module 750 may operate in conjunction with transmitter module 730 to transmit a signal from the portable device 112 to a resource so as to signal that the resource needs to operate in an active mode rather than a power-down mode. Thus, the portable device 112 can activate a resource that has been inactive for an extended period of time by utilizing the battery, or activate module 750.

Portable device 112 may be pre-registered with any number of resources, such that whenever portable device is within a predetermined distance, the portable device 112 will initiate communication with the particular resource(s). A code, or device identifier, such as a device PIN or device number, may be used to associate one or more devices as authorized to open or access, or sense one or more resources.

Portable device 112 may also include one or more memories used to store algorithms and programs, as described herein useful for implementation of the access functions.

Thus, it is also an embodiment of the invention that the portable device may provide power to the secured resource. For example, in a rarely accessed security system, an electronic door may not need a continued power source to keep its electrical mechanism running, so that the portable device may provide power to actuate the electronic door.

Figure 8:
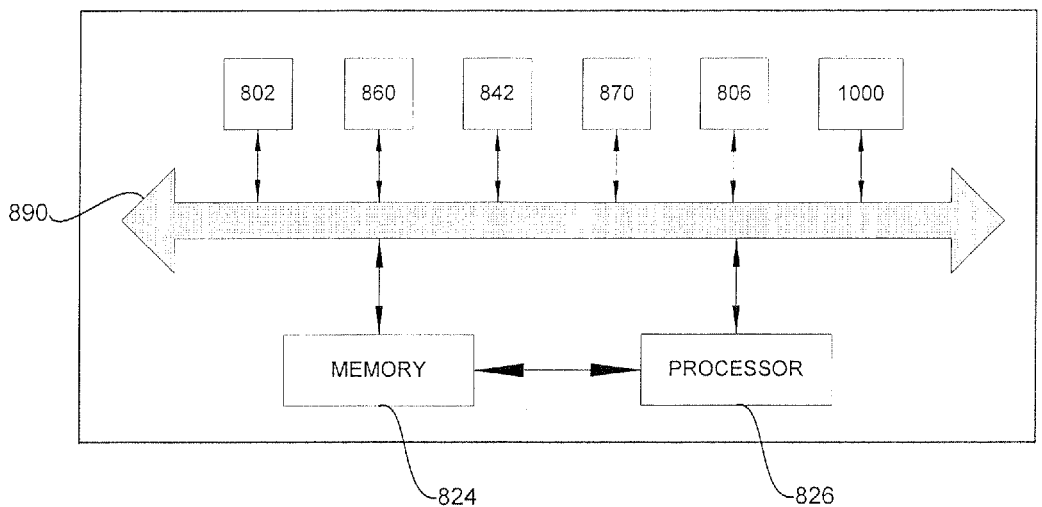
FIG. 8 illustrates an example of a secured resource according to an embodiment of the present invention.

FIG. 8 illustrates an example of a secured resource 104 according to an embodiment of the present invention. The resource 104 includes a transmitter 802, authentication module 860, proximity module 870, access module 806, power receptacle module 842, memory 824 and processor 826. These elements, or modules may be operatively coupled by a bus 890. The modules, such as authentication module 860, proximity module 870 may be for example, non-transitory electronic storage registers that operate in conjunction with processor 826 to perform the function of the algorithm, or program code stored therein.

Transmitter 802 is used to transmit a signal from the resource 104 to a portable device. The proximity module 870 is used to detect that a portable device is within transmission signal distance of the resource. The authentication unit 860 is used to receive transmission signals from a portable device and ascertain whether the tokens transmitted by the portable device are acceptable for a certain level of access. The level of access granted depends upon the type of tokens received.

Access module 806 is used to access the area of the resource 104 authorized by the authentication module 860. The access module 806 may be a lock or latch or electronic access capability. This access module 806 will open (i.e., provide or enable access) when accepted authorization is received. The access module 806 will not open (i.e., deny access) when the necessary authorization is not received. The access module 806 is able to permit selective access. For example, the access module 806 may permit a user to access or view certain portions of a database while prohibiting viewing of other portions of a data base that require enhanced authentication.

Power receptacle module 842 is used to receive a signal from portable device to modify the mode of operation of the resource 104. For example, a portable device may transmit an activate signal to cause the resource to become active from an energy or power-saving operational state. The power module 842 may also be used to store a minimum power threshold value that represents the minimum power required to be received from a portable device to activate the secured resource. Also, the power module 842 may store a minimum power threshold value for a portable device in instances when the secured resource transmits a power signal to a portable device. Furthermore, the power module 842 may receive a power activation or power transmission signal to activate a portable device. This activation may include, for example, causing the portable device to operate in a "wake-up" mode (as opposed to a "sleep" mode) or to cause the portable device to transmit a signal indicating the location of the portable device. Thus, the portable device and the secured resource can transfer power between each other as well as use the portable device to activate (either wake-up or permit access) the secured resource. Also, the power transmitted between the resource and the portable device may be used to operate the resource and/or the portable device. For example, the resource may have magnetic coils, or other electrical power unit that can be used to provide operating power to the resource. The electrical power unit can be activated by a signal from the portable device. Also, the portable device can be charged, recharged or powered by the resource. Specifically, the portable device may be connected to the resource to receive operating electrical power from the resource.

Memory module 824 and processing module 826 are used to store data and execute instructions, respectively, for the resource 104.

Figure 9:
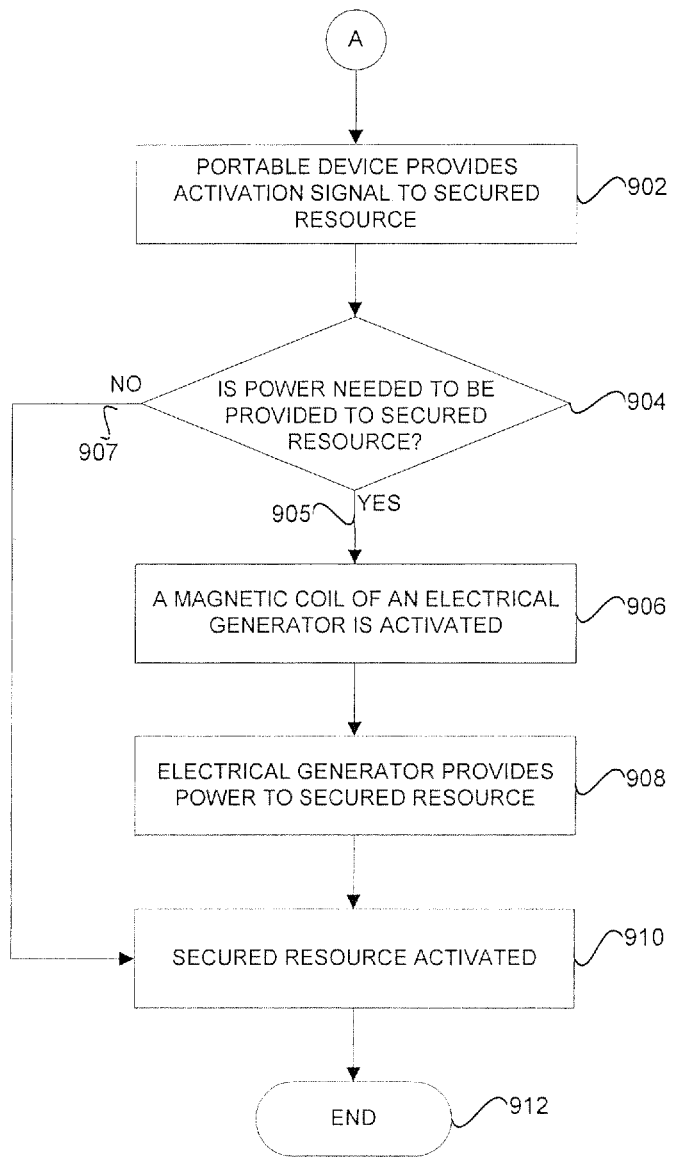
FIG. 9 illustrates a flowchart for an embodiment of the present invention in which the portable device provides power to the secured resource.

FIG. 9 illustrates a flowchart 900 for an embodiment of the present invention in which the portable device provides power to the secured resource. As described above, in relation to FIG. 3, it is an embodiment of the present invention that the portable device, when located within a predetermined distance of a particular secured resource, provides an activation signal to the secured resource, as shown in step 902. In step 904 a determination is made whether power is needed to be provided to the secured resource. If not, "no" line 907 shows that in step 910, the secured resource may be activated. If it is determined that power is needed in step 904, "yes" line 905 shows that in step 906, a power unit, such as a magnetic coil of an electrical generator, which may be installed in the secured resource, may be activated. Then the electrical generator provides adequate power that meets power requirement of the secured resource to the secured resource, as show in step 908. And the secured resource may be activated, as shown in step 910. At this point, the secured resource has power to determine whether the portable device is authorized to access one or more areas of the secured resource, as described herein. End step 912 shows that this process ends. In other words, the secured resource can use the portable device as a power source to activate an operation mode ("wake-up" mode as opposed to a "sleep-mode") and use the power generated to operate, or may use the portable device signal to permit access to the secured resource. Thus, the portable device and the secured resource can transfer power between each other.

Figure 10:
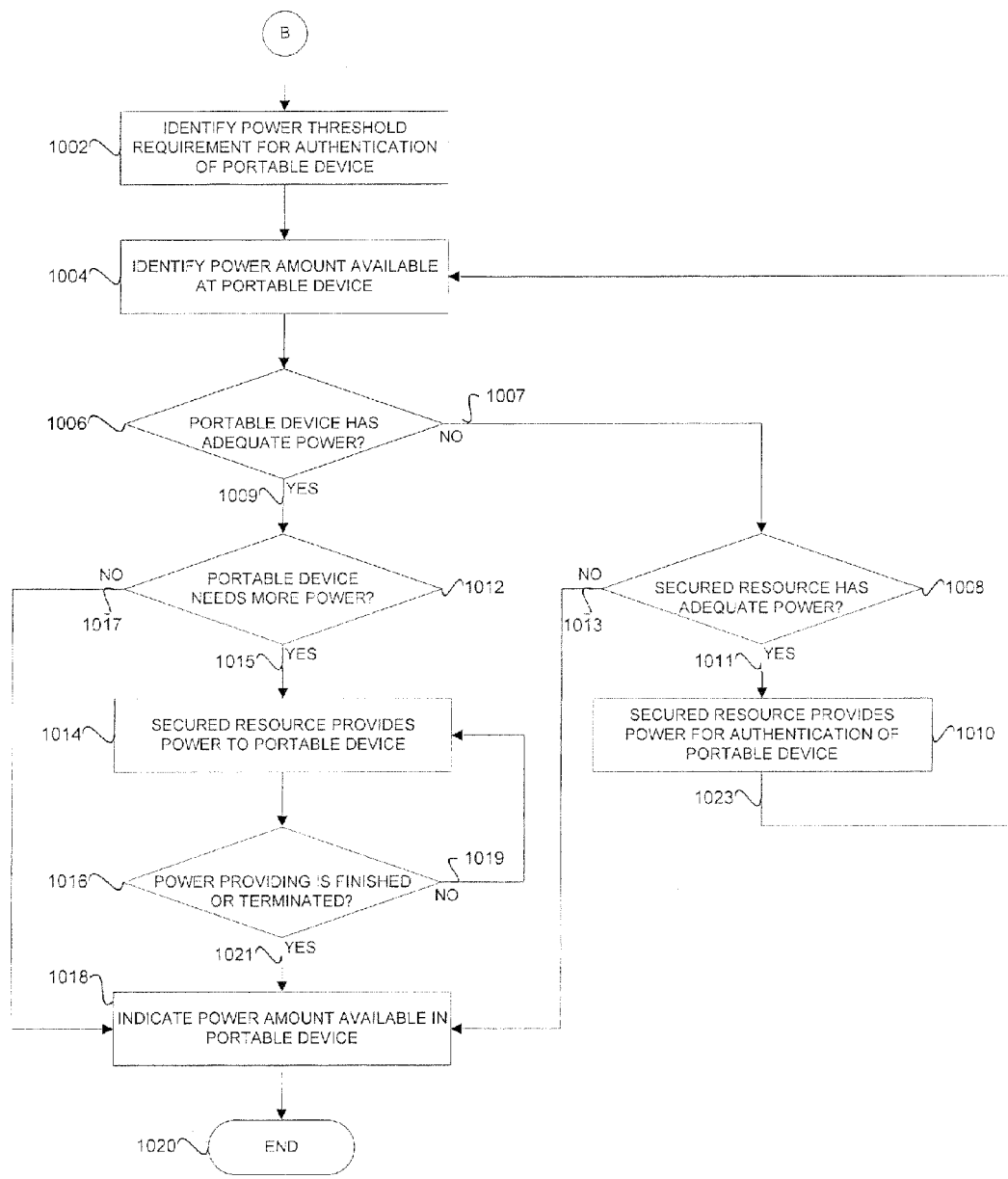
FIG. 10 illustrates a flowchart for an embodiment of the present invention in which the secured resource provides power for authentication of the portable device.

FIG. 10 illustrates a flowchart 1000 for an embodiment of the present invention in which the secured resource provides power for authentication of the portable device. As described above, in relation to FIG. 6, it is an embodiment of the present invention that the secured resource is able to identify a power requirement to authenticate a portable device, as shown in step 1002. In step 1004 the secured resource identifies power amount currently available at the portable device. In step 1006 a determination is made whether the portable device has adequate power to meet the power requirement. If not, "no" line 1007 leads to step 1008. In step 1008, a determination is made whether the secured resource has adequate power to meet the power requirement of the portable device. If not, "no" line 1013 shows that in step 1018 the power amount available in the portable device is indicated.

In step 1008, if the secured resource is able to provide adequate power to the portable device, "yes" line 1011 shows that in step 1010 the secured resource provides power for authentication to the portable device by user's operation to plug the portable device into the secured resource. The power transmission may also be performed by wireless transmission. Line 1023 leads back to step 1004 in which power amount of portable device is identified. In step 1006, if it is determined that the portable device has adequate power to meet the power requirement, "yes" line 1009 leads to step 1012.

In step 1012, a determination is made by the user whether the portable device needs more power. If not, "no" line 1017 shows that in step 1018 the power amount available in the portable device is indicated. If it is determined that the portable device needs more power in step 1012, "yes" line 1015 shows that in step 1014 the secured resource provides power to the portable device by user's operation to plug the portable device into the secured resource. The power transmission may also be performed by wireless transmission. In step 1016, a determination is made whether the power providing process is finished or terminated by the user. If not, "no" line 1019 leads back to step 1014 in which the power is provided to the portable device. If it is determined that the power providing process is finished or terminated by the user, "yes" line 1021 shows that in step 1018 the power amount available in the portable device is indicated. End step 1020 shows that this process ends.

Figure 11:
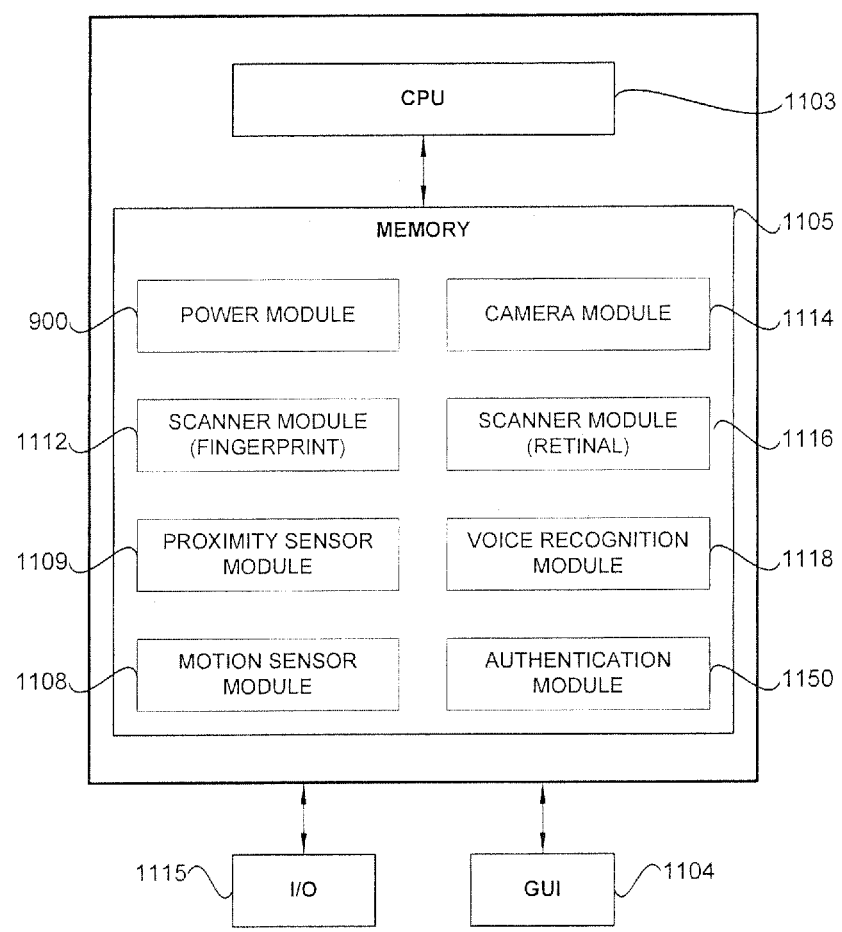
FIG. 11 illustrates an example of a processing and memory module for a portable device.

FIG. 11 illustrates an example of a processing and memory module for a portable device 112 according to an embodiment of the present invention. The portable device 112 includes CPU module 1103 and memory module 1105.

The CPU 1103 and memory module 1105 are operatively coupled such that the CPU 1103 can perform processing of data stored in memory 1105. Typically the CPU module 1103 is a processor, such as a commercially available computer processor including an ALU and other electronic components and circuitry to perform data processing.

Memory module 1105 includes power module 900, scanner module (fingerprint) 1112, proximity sensor module 1109, motion sensor module 1108, camera module 1114, scanner module (retina) 1116, voice recognition module 1118 and authentication module 1150. Also shown in FIG. 11 are I/O module 1115 and GUI 1104. The modules as described as stored in memory 1115 are typically program code that execute instructions stored on a non-transitory, computer-readable medium and are software components that operate with hardware components, such as one or more of the sensor modules shown in FIG. 4.

Power module 900 is a storage module that is used to store the processes and steps and program code, for example, instructions stored on a non-transitory computer-readable medium that may be executed by a processor, such as CPU 1103, to determine whether the portable device 112 is able to provide electrical power to a secured resource, as described in relation to FIG. 9. The power module 900 is used to transmit a signal activating a secured resource and provide a power signal. The power module 900 may store a threshold power value that is the minimum power required to activate a secured resource. This minimum magnitude is used such that unnecessary power is not wasted activating the secured resource.

Scanner module 1112 is a module that provides computer code, such as instructions stored on a non-transitory computer-readable medium, that when used in conjunction with hardware components, permits identification of a biometric, such as finger print data that is obtained by a fingerprint input device, such as shown in FIG. 2 as element 216 herein.

Proximity sensor module 1109 is, for example, program code that controls a sensor to determine at what distance a secured resource will recognize a portable device. This distance may be based on the type of secured resource, the type of portable device, the number of possible portable devices, the level of security of the portable device and the level of security of the secured resource. For example, if the secured resource has a low security threshold requirement, it will be more likely that the portable device will sense the secured resource. If the secured resource has a high threshold, the secured resource may not provide a signal that the portable device can detect and thus, the portable device will not sense that it is within a selected distance of a secured resource.

The proximity sensor module 1109 is typically a combination of hardware and software components that can receive and transmit signals, via I/O module 1115. The program code module of the proximity sensor module is shown in FIG. 11 and the hardware is shown in FIG. 7 as element 740. The proximity sensor module (hardware and software) is adapted to determine at what distance the portable device 112 can access selected portions or areas of the secured resource.

Motion sensor module 1108 is used to detect motion of a user relative to portable device 112. The motion sensor module 1108 is program code stored on, for example a non-transitory computer-readable medium that processes input from sensor 406 shown in FIG. 4. The program code of motion sensor module 1108 determines what type of gestures a user is making and whether a user is within a pre-selected distance of the portable device. The sensed motion may be adequate to open or access a secured resource, such as an automatic door or other secured resource that may be activated merely by the presence of a user relative to a portable device.

Camera module 1114 is a shown as a memory location storing instructions to identify images obtained from a camera or other image-obtaining device, such as camera 414, shown in FIG. 4. The camera module 1114 and hardware component 414 may be used to recognize a facial feature, or other image to permit access to a secured resource.

Scanner module 1116 is shown as a memory location that stores program code that operates with a scanner, as described herein, to detect a biometric, such as retinal data to determine access to a secured resource.

Voice recognition module 1118 is shown as a memory location that stores program code to operate and recognize voice data, such as sounds and voices obtained by microphone 418 shown in FIG. 4. The software of voice recognition module 1118 is adapted to determine whether received voice signals match stored, authorized voice signals and output a signal or other output affirming or denying a match.

Authentication module 1150 is program code stored in memory 1105 that can be used to store instructions that can be executed by CPU 1103 to determine whether a secured resource is able to communicate with the portable device as well as authorize the secured resource to permit access to the portable device, and thus the user or holder of the portable device. The authentication module 1150 may operate in conjunction with I/O module 1115, which is, for example, a transmitter, receiver, or transceiver that operates to send and/or receive signals or authentication data to/from a secured resource, server or other location to facilitate operation of recognizing and/or accessing a secured resource utilizing the portable device.

GUI 1104 provides a user interface for a user to operate and control via user input the portable device 112. It can include a keyboard, touch screen, mouse and other input devices (not shown) as well as a screen, display or monitor (not shown) to display image data and an audio output device (not shown) to output audio data.

Various embodiments of the embodiments of the present invention will now be described in relation to the description and figures mentioned above. For example, in some cases, the portable device itself is a security token. In a keyless entry system which is widely used in office buildings, it is sufficient to wave your badge in front of sensor near the door to gain access, and no other authentication is needed. In other cases, a specific portable device is needed. For example, if a retinal scan is required to access a secured resource, it does not matter whether a user uses his/her own portable device equipped with a retinal scanner, or he/she borrows a portable device from another user, because the security token is the image of the user's retina, instead of the portable device itself.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device, such as a non-transitory computer-readable medium. The application program can be uploaded to, and executed by, a machine, such as a processor, CPU or compiler, comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for an external device to gain access to a secure area of a resource, comprising:
   transmitting from the external device to the resource a signal that identifies the external device as capable of authentication;
   receiving by the external device from the resource an initiation of communication with the resource;

responding by the external device to the initiation of communication by transmitting to the resource a listing of a plurality of authentication mechanisms that the external device is capable of performing, the authentication mechanisms each being a device for identifying an attribute of a user of the external device;

receiving by the external device from the resource an indication of a particular combination of two or more authentication mechanisms selected from the listing of the plurality of authentication mechanisms is adequate to gain access to the secure area;

receiving by the external device from the resource a first request for use of a first authentication mechanism selected from the listing of the plurality of authentication mechanisms;

performing authentication using the first authentication mechanism at the external device;

transmitting a first token from the external device to the resource, the first token representing a result of the first authentication mechanism;

receiving by the external device from the resource another request for use of another authentication mechanism selected from the listing of the plurality of authentication mechanisms;

performing authentication using the second authentication mechanism at the external device;

repeating the transmitting a token step and receiving another request step until transmittal of the combination of authentication mechanisms is completed; and gaining access to the secure area in response to acceptance of the two or more of the tokens by the resource.

2. The method of claim 1, wherein the initiation is a wireless communication.

3. The method of claim 1, wherein the external device is a portable device.

4. The method of claim 1, wherein the authentication mechanism is possession of the external device.

5. The method of claim 1, wherein the authentication mechanism is a biometric.

6. The method of claim 1, wherein biometric includes retinal scan data.

7. The method of claim 1, wherein the authentication mechanism is a passcode.

8. The method of claim 1, wherein the external device transmits an activation signal to the resource.

9. The method of claim 1, wherein the external device transmits an electrical power generation signal to the resource.

10. A method for a resource to grant access to a secure area of the resource to an external device, comprising:
   receiving at the resource a signal from the external device that identifies itself as capable of authentication;
   initiating a communication from the resource with the external device;
   receiving from the external device a list of a plurality of authentication mechanisms that the external device is capable of performing, the authentication mechanisms each for identifying an attribute of a user of the external device;
   transmitting to the external device a first request for use of a first authentication mechanism selected from the plurality of authentication mechanisms;
   receiving from the external device a first authentication token for the first authentication mechanism in response to the first request, the first authentication token being a result of authentication at the external device using the first authentication mechanism at the external device;
   transmitting to the external device a second request for use of a second authentication mechanism selected from the plurality of authentication mechanisms;
   receiving from the external device a second authentication token for the second authentication mechanism in response to the second request, the second authentication token being a result of authentication at the external device using the second authentication mechanism at the external device; and
   granting to the external device access to the secure area based upon acceptability of the authentication tokens received in response to the first request and the second request.

11. The method of claim 10, wherein the communication is a wireless communication.

12. The method of claim 10, wherein the authentication token is from a biometric device.

13. The method of claim 10, wherein the resource transmits an activation signal to the external device.

14. The method of claim 10, wherein the resource transmits electrical power to the external device.

15. A portable device for gaining access to a secure area of a resource, comprising:
   a transmitter to transmit a signal from the portable device to the resource that identifies a listing of a plurality of authentication mechanisms that the portable device is capable of performing for identifying an attribute of a user;
   a receiver to receive at the portable device from the resource an initiation of a communication with the resource;
   a controller to respond to the received initiation of the communication by transmitting to the resource two or more authentication tokens to the resource, the authentication tokens being a result of authentication at the portable device using corresponding two or more authentication mechanisms of the portable device;
   wherein the receiver receives from the resource a first request for use of a first authentication mechanism selected by the resource from the plurality of authentication mechanisms and, in response, the transmitter transmits to the resource a first authentication token, the first authentication token representing a result of authentication at the portable device using the first authentication mechanism;
   wherein the receiver receives from the resource a second request for use of a second authentication mechanism selected by the resource from the plurality of authentication mechanisms and, in response, the transmitter transmits to the resource a second authentication token, the second authentication token representing a result of authentication at the portable device using the second authentication mechanism; and
   wherein the portable device gains access to the secure area in response to the resource receiving transmittal of the authentication tokens in response to the first request and the second request.

16. The portable device as claimed in claim 15, wherein the communication is a wireless communication.

17. An authentication unit of a resource for granting access to a secure area of the resource to an external device, comprising:
   a receiver to receive a signal from the external device that identifies the external device as capable of authentication;
   a communicator to initiate a communication from the resource with the external device;

wherein the receiver receives from the external device a list of a plurality of authentication mechanisms that the external device is capable of performing, the authentication mechanisms each for identifying an attribute of a user of the external device;

a transmitter to transmit to the external device a first request to the external device for use of a first authentication token, corresponding to a first authentication mechanism selected by the authentication unit from the list of the plurality of authentication mechanisms, the first authentication token representing a result of authentication at the external device using the first corresponding authentication mechanism of the external device;

wherein the receiver receives the first authentication token from the external device in response to the first request;

wherein the transmitter then transmits to the external device a second request to the external device for use of a second authentication token corresponding to a second authentication mechanism selected by the authentication unit from the list of the plurality of authentication mechanisms, the second authentication token representing a result of authentication at the external device using the second corresponding authentication mechanism of the external device;

wherein the receiver receives from the external device the second authentication token in response to the second request; and an authenticator to grant the external device access to the secure area based upon acceptability of the authentication tokens received in response to the first request and the second request.

18. The authentication unit as claimed in claim 17, wherein the communication is wireless.

\* \* \* \* \*